US012706488B2

(12) United States Patent
Nugent, Jr.

(10) Patent No.: US 12,706,488 B2
(45) Date of Patent: Aug. 11, 2026

(54) POWER RECEIVERS AND HIGH POWER OVER FIBER

(71) Applicant: LASERMOTIVE, INC., Kent, WA (US)

(72) Inventor: Thomas J. Nugent, Jr., Bellevue, WA (US)

( * ) Notice: Subject to any disclaimer, the term of this patent is extended or adjusted under 35 U.S.C. 154(b) by 0 days.

(21) Appl. No.: 18/858,275

(22) PCT Filed: Apr. 18, 2023

(86) PCT No.: PCT/US2023/065919
§ 371 (c)(1),
(2) Date: Oct. 18, 2024

(87) PCT Pub. No.: WO2023/205664
PCT Pub. Date: Oct. 26, 2023

(65) Prior Publication Data
US 2025/0273998 A1 Aug. 28, 2025

Related U.S. Application Data

(60) Provisional application No. 63/332,663, filed on Apr. 19, 2022.

(51) Int. Cl.
*H02J 50/30* (2016.01)
*H02J 50/80* (2016.01)
*H02S 40/20* (2014.01)
*H02S 40/22* (2014.01)
*H02S 40/42* (2014.01)
*H02J 101/24* (2026.01)

(52) U.S. Cl.
CPC .............. *H02J 50/30* (2016.02); *H02J 50/80* (2016.02); *H02S 40/20* (2014.12); *H02S 40/22* (2014.12); *H02S 40/42* (2014.12); *H02J 2101/24* (2026.01)

(58) Field of Classification Search
CPC ............ H02J 50/30; H02J 50/80; H02S 40/20
USPC .......................................................... 307/149
See application file for complete search history.

(56) References Cited

U.S. PATENT DOCUMENTS 7,813,646 B2 10/2010 Furey
8,502,064 B2 * 8/2013 Pellizzari ................ F02B 63/04 136/253
9,090,315 B1 7/2015 Stone
9,800,091 B2 10/2017 Nugent, Jr.
9,838,143 B2 12/2017 Chan
9,912,379 B2 3/2018 Hyde
10,483,420 B2 11/2019 Lasich
10,615,301 B1 * 4/2020 Tillotson .............. G02B 5/0221
10,673,375 B2 6/2020 Bashford
10,825,944 B2 11/2020 Kare
(Continued)

OTHER PUBLICATIONS

International Preliminary Report on Patentability Issued in PCT Application No. PCT/US23/65919, Mailed Oct. 8, 2024, 15 pages.
Rosolem, “Power-Over-Fiber Applications for Telecommunications and for Electric Utilities,” Optical Fiber and Wireless Communications, 2017, 25 pages.
(Continued)

*Primary Examiner* — Alfonso Perez Borroto

(57) ABSTRACT

A power beaming system operates at high power to deliver power from a transmitter to a receiver over a fiber connection (PoF) or through free space (FSP). The receiver may have a gross design efficiency ratio of at least 70%, and the system may have a system design efficiency ratio of 40% or more. For PoF systems, the fiber length may range from 5 m or less to 1 km or more.

20 Claims, 8 Drawing Sheets

(56) References Cited

U.S. PATENT DOCUMENTS

| | | | | |
|---|---|---|---|---|
| 10,908,358 | B1 * | 2/2021 | Bock | G02B 6/3644 |
| 11,349,351 | B2 | 5/2022 | Nydell | |
| 12,206,036 | B2 | 1/2025 | Stone | |
| 2008/0245930 | A1 * | 10/2008 | Nayfeh | B64U 50/19 244/135 A |
| 2013/0330085 | A1 * | 12/2013 | Kusakari | H04W 4/33 398/115 |
| 2014/0319922 | A1 * | 10/2014 | Shinohara | H02J 50/80 307/104 |
| 2014/0341591 | A1 * | 11/2014 | Scherer | A61B 5/6867 398/140 |
| 2015/0034144 | A1 * | 2/2015 | Stone | H02S 40/42 136/246 |
| 2015/0091495 | A1 * | 4/2015 | Mahameed | H02J 7/35 320/101 |
| 2019/0020304 | A1 * | 1/2019 | Bashford | G02B 19/0042 |
| 2020/0403457 | A1 * | 12/2020 | Nydell | H10F 77/488 |

OTHER PUBLICATIONS

Nugent, et al., "15 Years of Laser Power Beaming Demonstrations," Proc. SPIE 13359, Optical Power Delivery, 133590F (Mar. 19, 2025); https://doi.org/10.1117/12.3043841, 12 pages (preprint).

Sayles, et al., "Long-Duration Operation of 100W Power over Fiber Unit," Proc. SPIE 13359, Optical Power Delivery, 133590G (Mar. 19, 2025); https://doi.org/10.1117/12.3043817, 7 pages (preprint).

Kirby, et al., "Power over Fiber for Undersea Applications," Proc. SPIE 13359, Optical Power Delivery, 133590H (Mar. 19, 2025); https://doi.org/10.1117/12.3043798, 4 pages (preprint).

Kirby, et al., "Characterization of High Power, Kilometer-Scale Power Over Fiber Cabling," Proc. SPIE 13359, Optical Power Delivery, 133590E (Mar. 19, 2025); https://doi.org/10.1117/12.3043825, 4 pages (preprint).

Affidavit of William C. Stone, submitted in support of U.S. Appl. No. 14/292,495, bearing a date of May 30, 2014 (14 pages).

* cited by examiner

POWER RECEIVERS AND HIGH POWER OVER FIBER

This application is a national phase application under 35 U.S.C. § 371 of PCT Application No. PCT/US2023/065919, filed Apr. 18, 2023, which claims benefit under 35 U.S.C. § 119 (e) of U.S. Provisional Patent Application No. 63/332,663, filed Apr. 19, 2022, each of which of the previously mentioned applications is incorporated herein by reference to the extent not inconsistent herewith.

This application claims priority under 35 U.S.C. 119(e) to U.S. Provisional Application No. 63/332,663, filed Apr. 19, 2022. This related application is incorporated by reference herein to the extent not inconsistent herewith.

BACKGROUND

Power beaming is an emerging method of transmitting power to places where it is difficult or inconvenient to access using wires, by transmitting a beam of electromagnetic energy to a specially designed receiver which converts it to electricity. Power beaming systems may be free-space (where a beam is sent through atmosphere, vacuum, liquid, or other non-optically-designed media), or power-over-fiber ("PoF"), where the power is transmitted through an optical fiber. The latter may share certain disadvantages with wires in some circumstances, but may also offer increased transmission efficiency, electrical isolation, and/or safety. Free-space power beaming may be more flexible, but it may also offer more challenges for accurate targeting of receivers and avoiding hazards such as reflections and objects intruding on the power beam.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventors' approach to the particular problem, which in and of itself may also be inventive.

SUMMARY

Densification requirements for 5G networks will require the deployment of millions of new 5G small cells in the coming years. Traditional copper-based cabling power solutions may already be hindering the early deployments of 5G small cells and, if alternative network power distribution solutions are not found, may negatively impact future 5G network deployment times and increase 5G network build costs. Power over fiber may offer a solution to this problem, bypassing certain requirements in distribution of power and offering a lighter-weight, easier solution.

In one aspect, a power receiver includes an optics unit, an array including a plurality of PV cells, a thermal management system configured to remove heat from the array, and a power management and distribution (PMAD) system configured to receive electricity from the array and to supply it to an external device. The optics unit is configured to receive a power beam and to shape the power beam, the shaped power beam having an operating intensity profile. The array is configured to convert the power beam into electricity. Each of the PV cells of the array has a cell efficiency defined as the ratio of an amount of electrical power produced by the PV cell divided by an amount of optical power incident on a location of that cell in the operating intensity profile of the shaped power beam. The array has a gross array efficiency defined as the ratio of an amount of electrical power produced by the array divided by an amount of optical power in the shaped power beam. The receiver has a gross design efficiency ratio defined as a ratio of the gross array efficiency to the average cell efficiency of the PV cells of the array. The receiver gross design efficiency ratio is greater than 70%.

In another aspect, a power transmission system includes a power transmitter configured to create a power beam and to transmit the power beam into a transmission medium and a power receiver. The power transmitter includes a laser, a transmitter thermal management system, and a control system. The power receiver is configured to receive the power beam from the transmission medium, direct the power beam to a plurality of photovoltaic (PV) cells to convert the power beam into electrical power, and provide the converted electrical power to an external device. The power transmission system has an end-to-end efficiency defined as an amount of electrical power provided to the external device divided by an amount of power consumed by the power transmitter to create the power beam, a laser efficiency defined as an amount of optical power of the power beam as it exits the laser divided by an amount of electrical power consumed by the laser to create the power beam, a transmission medium efficiency defined as an amount of optical power as the power beam enters the power receiver divided by an amount of optical power as the power beam enters the transmission medium, a PV cell efficiency defined as an average efficiency of conversion of optical power into electrical power by the plurality of PV cells, and a gross system design efficiency defined as the end-to-end efficiency divided by a product of the gross laser efficiency, the transmission medium efficiency, and the gross PV cell efficiency. The gross system design efficiency is greater than 40%.

In another aspect, a method of receiving power includes receiving a power beam at an optics unit, shaping the power beam with the optics unit, the shaped power beam having an operating intensity profile, receiving the shaped power beam from the optics unit at an array including a plurality of photovoltaic (PV) cells, converting the received power beam into electricity with the array of PV cells, wherein converting the received power beam into converted electricity includes removing heat from the array of PV cells with a receiver thermal management system, receiving the converted electricity with a power management and distribution (PMAD) system, and supplying the received converted electricity to an external device. Each of the PV cells of the array has a cell efficiency defined as the ratio of an amount of electrical power produced by the PV cell divided by an amount of optical power incident on the cell at the operating intensity of the shaped power beam. The array has a gross array efficiency defined as the ratio of an amount of electrical power produced by the array divided by an amount of optical power in the shaped power beam. The receiver has a gross design efficiency ratio defined as a ratio of the gross array efficiency to the average cell efficiency of the PV cells of the array. The receiver efficiency ratio is greater than 70%.

In another aspect, method of transmitting power includes generating a power beam with a power transmitter, transmitting the generated power beam into a transmission medium, receiving the power beam from the transmission medium at a power receiver remote from the power transmitter, directing the received power beam to a plurality of photovoltaic (PV) cells to convert the power beam into electrical power, and providing the converted electrical power to an external device. The power transmitter includes a laser, a transmitter thermal management system, and a control system. The power transmission method has an end-to-end efficiency defined as an amount of electrical power provided to the external device divided by an amount of power consumed by the power transmitter to create the power beam, a laser efficiency defined as an amount of optical power of the power beam as it exits the laser divided by an amount of electrical power consumed by the laser to create the power beam, a transmission medium efficiency defined as an amount of optical power as the power beam enters the power receiver divided by an amount of optical power as the power beam enters the transmission medium, a PV cell efficiency defined as an average efficiency of conversion of optical power into electrical power by the plurality of PV cells, and a gross system design efficiency defined as the end-to-end efficiency divided by a product of the laser efficiency, the transmission medium efficiency, and the PV cell efficiency. The gross system design efficiency is greater than 40%.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF FIGURES

The drawing figures depicts one or more implementations in accordance with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
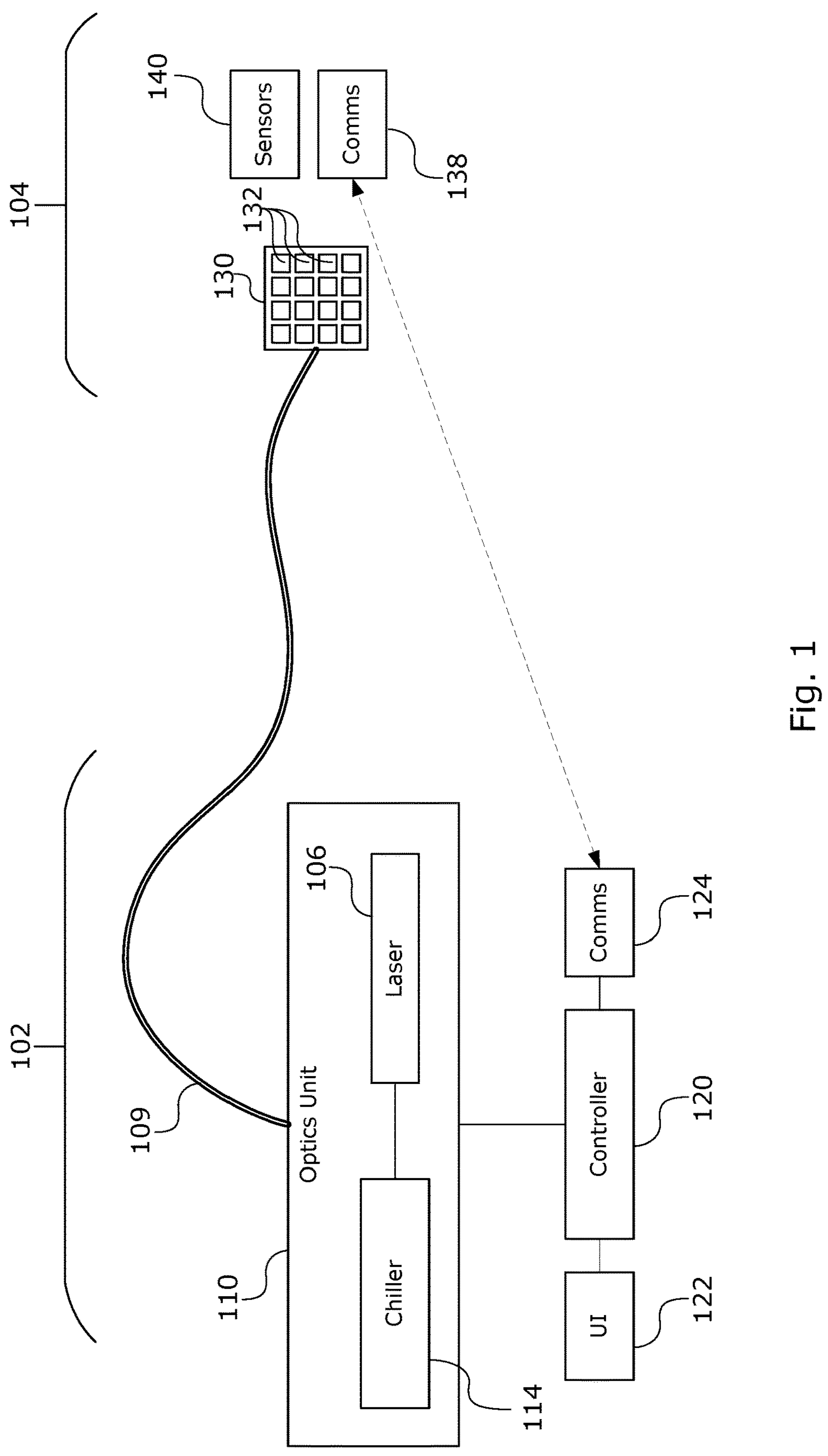
FIG. 1 is a schematic diagram of a power beaming transmitter and receiver.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detail, in order to avoid unnecessarily obscuring aspects of the present teachings. Those of ordinary skill in the art will nevertheless understand the features of these methods, procedures, components, and/or circuitry and how they may be used in the descriptions below. Other relevant material may be found in other patents and applications as follows:

| | | |
|---|---|---|
| U.S. Pat. No. 9,800,091 | Issued Oct. 24, 2017 | Aerial Platform Powered Via an Optical Transmission Element |
| U.S. Pat. No. 10,374,466 | Issued Aug. 6, 2019 | Energy Efficient Vehicle with Integrated Power Beaming |
| U.S. Pat. No. 10,459,114 | Issued Oct. 29, 2019 | Wireless Power Transmitter and Receiver |
| U.S. Pat. No. 10,488,549 | Issued Nov. 26, 2019 | Locating Power Receivers |
| U.S. Pat. No. 10,580,921 | Issued Mar. 3, 2020 | Power-Over-Fiber Safety System |
| U.S. Pat. No. 10,634,813 | Issued Apr. 28, 2020 | Multi-Layered Safety System |
| U.S. Pat. No. 10,673,375 | Issued Jun. 2, 2020 | Power-Over-Fiber Receiver |
| U.S. Pat. No. 10,816,694 | Issued Oct. 27, 2020 | Light Curtain Safety System |
| U.S. Pat. No. 10,825,944 | Issued Nov. 3, 2020 | Device for Converting Electromagnetic Radiation into Electricity, and Related Systems and Methods |
| U.S. Pat. No. 11,105,954 | Issued Aug. 31, 2021 | Diffusion Safety System |
| U.S. Pat. No. 11,368,054 | Issued Jun. 21, 2022 | Remote Power Safety System |
| U.S. Pat. No. 11,581,953 | Filed Nov. 2, 2020 | Dual-Use Power Beaming System |
| U.S. application No. 17/581,667 | Filed Jan. 21, 2022 | Light Curtain System with Enhanced Geometric Configurations |
| U.S. application No. 17/613,015 | Filed Nov. 19, 2021 | Remote Power Beam-Splitting |
| U.S. application No. 17/613,021 | Filed Nov. 19, 2021 | Safe Power Beam Startup |
| U.S. application No. 17/613,028 | Filed Nov. 19, 2021 | Beam Profile Monitor |
| U.S. application No. 17/760,731 | Filed Mar. 15, 2022 | Optical Power for Electronic Switches |
| U.S. application No. 18/054,867 | Filed Nov. 11, 2022 | Beam Homogenization at Receiver |
| International Application No. PCT/US16/33117 | Filed May 18, 2016 | Power Beaming VCSEL Arrangement |
| International Application No. PCT/US22/13570 | Filed Jan. 24, 2022 | Power Receiver Electronics |
| International Application No. PCT/US22/80173 | Filed Nov. 18, 2022 | Dual Contra-Focal Homogenizer |

Each of these related applications and patents is incorporated by reference herein to the extent not inconsistent herewith.

As discussed above, power beaming is becoming a viable method of powering objects in situations where it is inconvenient or difficult to run wires. For example, free-space power beaming may be used to deliver electric power via a ground-based power transmitter to power a remote sensor, to recharge a battery, or to power an unmanned aerial vehicle (UAV) such as a drone copter, allowing the latter to stay in flight for extended periods of time. Power over fiber (PoF) systems usually require optical fiber (or an equivalent) to be run from a power source to a receiver, but may nevertheless provide electrical isolation and/or other advantages (e.g., lighter weight) over traditional copper wires which carry electricity instead of light.

It will be understood that the term "light source" is intended to encompass all forms of electromagnetic radiation that may be used to transmit energy, and not only visible light. For example, a light source (e.g., a diode laser, fiber laser, light-emitting diode, magnetron, or klystron) may emit ultraviolet, visible, infrared, millimeter wave, microwave, radio waves, and/or other electromagnetic waves, any of which may be referred to herein generally as "light." The term "power beam" is used herein interchangeably with "light beam" to mean a high-irradiance transmission, generally directional in nature, which may be coherent or incoherent, of a single wavelength or multiple wavelengths, and pulsed or continuous. A power beaming system may be free-space, PoF, or may include components of each. For example, a transmitter may transmit a free-space power beam to a receiver surface, which may conduct it as light over an optical fiber to a photovoltaic (PV) cell which converts it to electricity. For the sake of readability, the description may use the term "laser" to describe a light source; nevertheless, other sources such as (but not limited to) light-emitting diodes, magnetrons, or klystrons may also be contemplated unless context dictates otherwise.

The terms "fiber" or "optical fiber," as used herein, includes all types of waveguides that may be used to carry a power beam. Nonlimiting examples include a metal waveguide carrying a microwave or RF beam or an optical waveguide (fiber) carrying UV, visible, or IR beams. Nonlimiting examples of the latter include a step-index multimode silica fiber, a gradient-index fiber, a photonic crystal hollow core fiber, a nested anti-resonant hollow core fiber (NANF), or a ZBLAN fiber (which may include fluorine combined with some combination of Zr, Ba, La, Al, and Na, and which may be grown in microgravity). In contrast, "free space," when used in connection with power beaming, generally means that the power beam travels through air, vacuum, a fluid such as water, or another medium that is not designed to be a waveguide.

For many applications, a power receiver is arranged to receive the free-space or PoF power beam and convert it to electricity, for example using PV cells or other components for converting light to electricity (e.g., a rectenna for converting microwave power or a heat engine for converting heat generated by the light beam to electricity). For the sake of readability, this application may refer to "PV cells" with the understanding that other components having a similar function (such as but not limited to those listed above) may be substituted without departing from the scope of the application, unless context dictates otherwise.

Power Beaming Systems

FIG. 1 is a schematic diagram of a power beam transmitter 102 and receiver 104 in a power-over-fiber (PoF) system. Laser 106 is a component of optics unit 110, which directs a power beam into optical fiber 109, which carries the beam to power receiver 104. In some implementations, optical fiber 109 may also carry telemetry and/or safety signals, either in the same fiber as the power beam or in a separate fiber which may be cabled with the power fiber. Optional chiller 114 is shown as connected to laser 106, but other components of transmitter 102 may also have independent or connected thermal management systems as required. Also shown in FIG. 1 as part of transmitter 102 are TX controller 120, user interface 122 and TX communication unit 124, all of which are further discussed below in connection with FIG. 2. It will be understood that transmitter 102 may include other elements, such as beam shapers, guard beams, or other appropriate accessory elements, that have been omitted from FIG. 1 for the sake of simplicity of the illustration. Some of these elements are shown schematically below in FIG. 2, but those of ordinary skill in the art will understand how to combine optical and control elements in a power transmitter.

Receiver 104 includes a PV array 130, which includes a plurality of individual PV cells 132 (not all PV cells are labeled in order to avoid unnecessarily cluttering the figure). PV cells 132 convert incoming the power beam into electricity as further described below. RX communication unit 138 is in communication with TX communication unit 124 (as indicated by the dashed line), and may be used for safety, tracking, telemetry, feedback control, or any other purpose for which it may be desirable for transmitter 102 and receiver 104 to communicate. While the illustrated embodiment provides communication across a separate channel such as a radio link between transmitter 102 and receiver 104, it is also contemplated that communication may be accomplished via modulation of the power beam or other appropriate components of the power beaming system. As described above, telemetry and/or safety signals may also be carried in a separate optical fiber, which may in some implementations be cabled with a power fiber in optical fiber 109. Receiver 104 may also include optional RX sensors 140, further described below in connection with FIG. 3. FIG. 1 does not illustrate a free-space power beaming system, but those of ordinary skill in the art will understand that optical fiber 109 may be replaced with air or another free space medium with appropriate changes to optics, telemetry, and safety systems at both ends of the medium.

Figure 2:
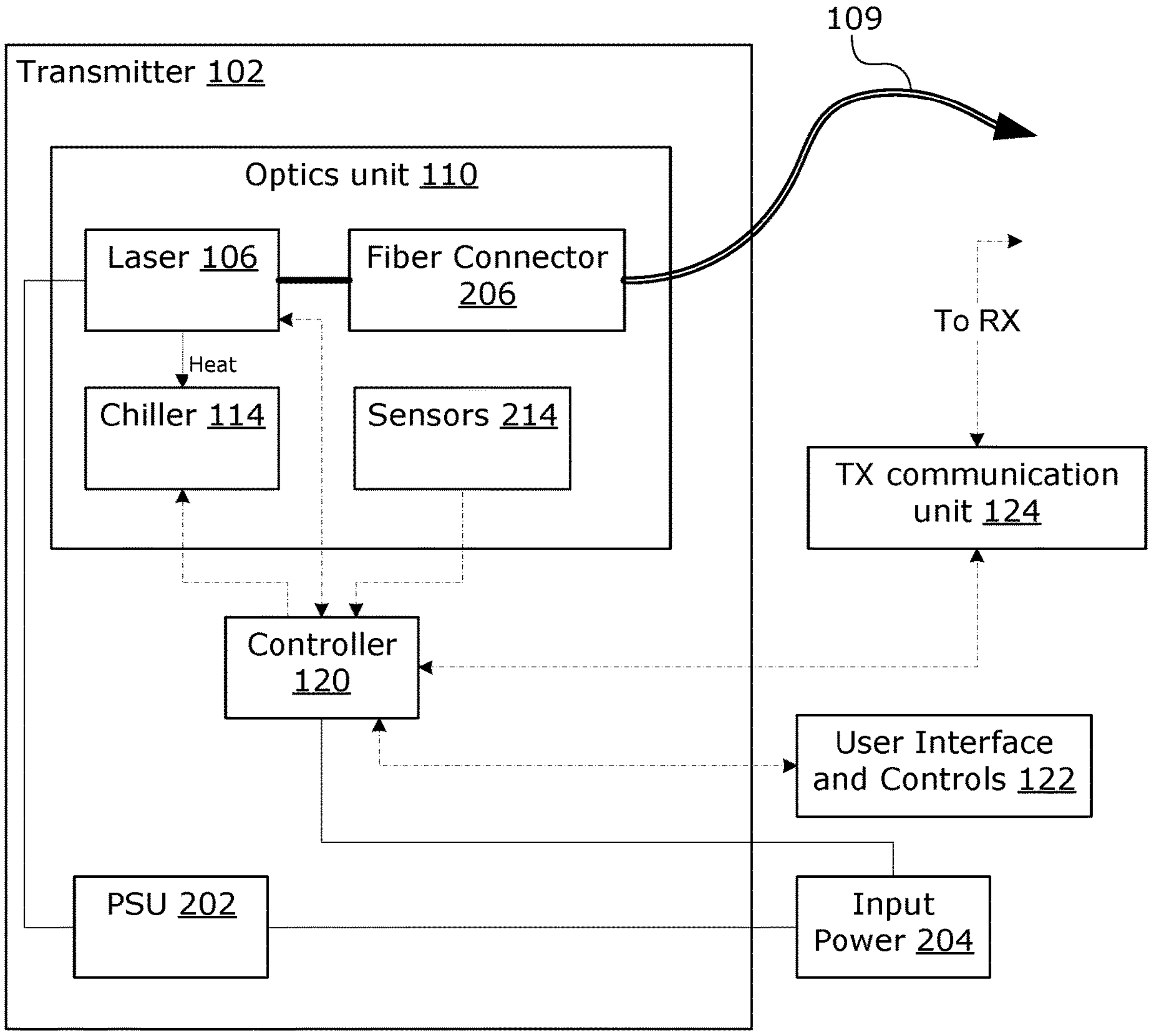
FIG. 2 is an abstracted diagram of the power beaming transmitter of FIG. 1, showing interrelationships between components of the transmitter.

FIG. 2 shows functional relationships between components of the transmitter. Transmitter 102 includes a laser 106, but it will be understood that other light-generating components, such as an LED or a magnetron, may be substituted for laser 106 in some implementations. Laser 106 is connected to controller 120, power supply unit (PSU) 202 (which is in turn connected to input power 204), and a thermal management system (chiller) 114. Controller 120 controls operation of laser 106 and may be manual (for example using optional user interface 122, which in some implementations may be a display providing data about power transmission, and may in other implementations may allow control of laser 106 or other elements of transmitter 102), partially automated, or fully automated, depending on design constraints of the system. In particular, controller 120 may receive input from a safety system (not shown), for example as described in commonly owned U.S. Pat. Nos. 10,634,813, 10,816,694, and 11,105,954, and U.S. patent application Ser. Nos. 16/079,073, 17/581,667, and 17/613,021. The safety system may be designed to turn down or to turn off the beam, for example when an uninterrupted optical path from transmitter 102 to receiver 104 cannot be assured or when other hazardous conditions may be associated with continuing to beam power. Controller 120 may receive input (data) from other components, for example to monitor the health or temperature of laser 106, such as one or more sensors 214. PSU 202 draws power from input power 204, which may be, for example, a power grid, a generator, or a battery, and supplies it to laser 106. In the figure, controller 120 and chiller 114 are directly connected to input power 204, but in other embodiments, these or other components may receive power from power supply unit 202. Chiller 114 circulates coolant (which may be water or other fluid) to laser 106 (and/or other components of the transmitter as necessary) and makes sure that the coolant does not exceed safe values. In some implementations, sensors 214 also monitor the temperature of laser 106 (for example, under control of controller 120), so that the system can be shut down if laser 106 becomes too hot without it being detected by chiller 114 (e.g., in case of a coolant leak).

As shown in FIG. 2, the power beam emerges from light source 106 and enters fiber connector 206, from which it passes into fiber 109. Control and data signals may pass between controller 120 and other components (e.g., laser 106, chiller 114, user interface 122, communication unit 124, or sensor(s) 214), as shown by dot-dashed lines in FIG. 2, and controller 120 may control communication with the receiver, for example using transmitter communication unit 124.

Figure 3:
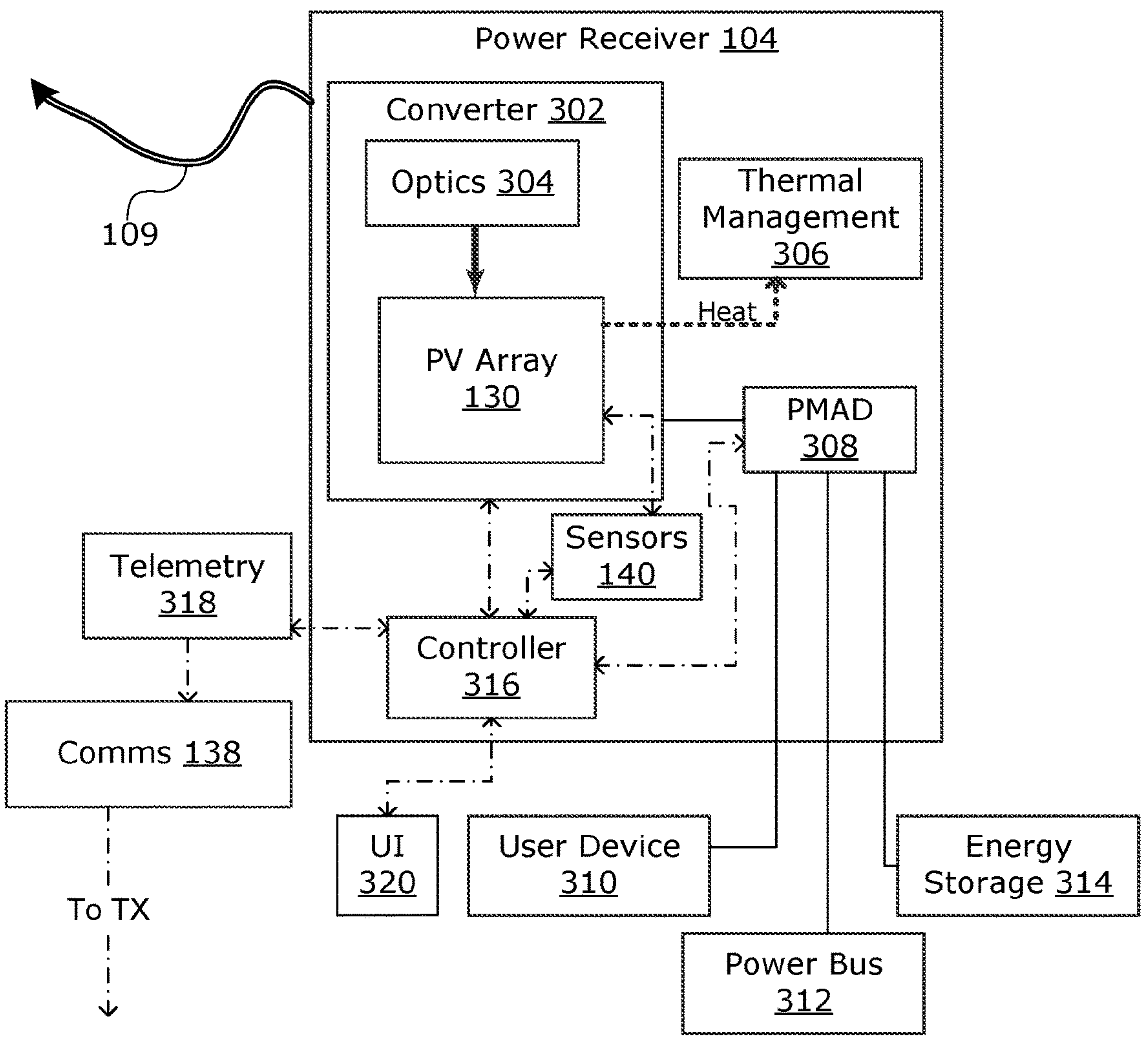
FIG. 3 is an abstracted diagram of the power receiver of FIG. 1, showing interrelationships between components of the receiver.

FIG. 3 shows functional relationships between components of power receiver 104. Illustrated receiver 104 includes power converter 302, which includes PV array 130 of PV cells 132. Power converter 302 is configured to convert the incoming power beam from fiber 109 into electricity (or, in some implementations, into another useful form of energy). Receiver 104 may also include optics 304, which may shape or modify the received beam before it reaches PV array 130, for example as described in U.S. patent application Ser. No. 17/613,028. Shaping/modification of the beam may include, for example, spreading the beam out, concentrating it, splitting it into discrete regions directed to individual PV cells, or shaping the beam profile to provide more even illumination of different PV cells of PV array 130. In many implementations, PV array 130 includes a thermal management system 306. This system may include passive or active cooling, and it may be configured to send a signal back to transmitter 102 if any part of PV array 130 exceeds safe temperature limits (for example, via RX communication unit 138).

Power converter 302 may further be connected to power management and distribution (PMAD) system 308. PMAD system 308 may power user devices 310, a power bus 312, energy storage devices 314, or other appropriate components. PMAD system 308 may be connected to controller 316, which may monitor PV array 130 via sensors 140, for example monitoring voltage, current, and/or temperature of individual photovoltaic cells, groups of cells, or of the whole array, voltage and/or current of the PMAD or of individual loads. In some implementations, controller 316 may also include Maximum Power Point Tracking (MPPT) for PV array 130, while in other implementations MPPT may be handled by PMAD system 308. PMAD system 308 may also include DC/DC converters, for example to provide power to devices 310, 312, 314 with preferred voltage and current characteristics. Telemetry unit 318 may send any or all of the above data back to the transmitter for use in controlling the power beam, for example through RX communications unit 138. In some implementations, controller 316 may communicate with a receiver user interface 320, which may allow local viewing and/or control of receiver operations by a user of the power receiver.

Any receiver components that require power, for example but not limited to thermal management system 306, RX communication unit 138, PMAD system 308, controller 316, telemetry unit 318, and/or user interface 320, may be powered by power converter 302 (directly or via PMAD 308) if desired. If components are powered by converter 302, the system might include a battery (either as part of energy storage 314 or as a separate component) to power these components during start-up or at other times when converter 302 is not supplying power.

Efficiency Calculation

Figure 4:
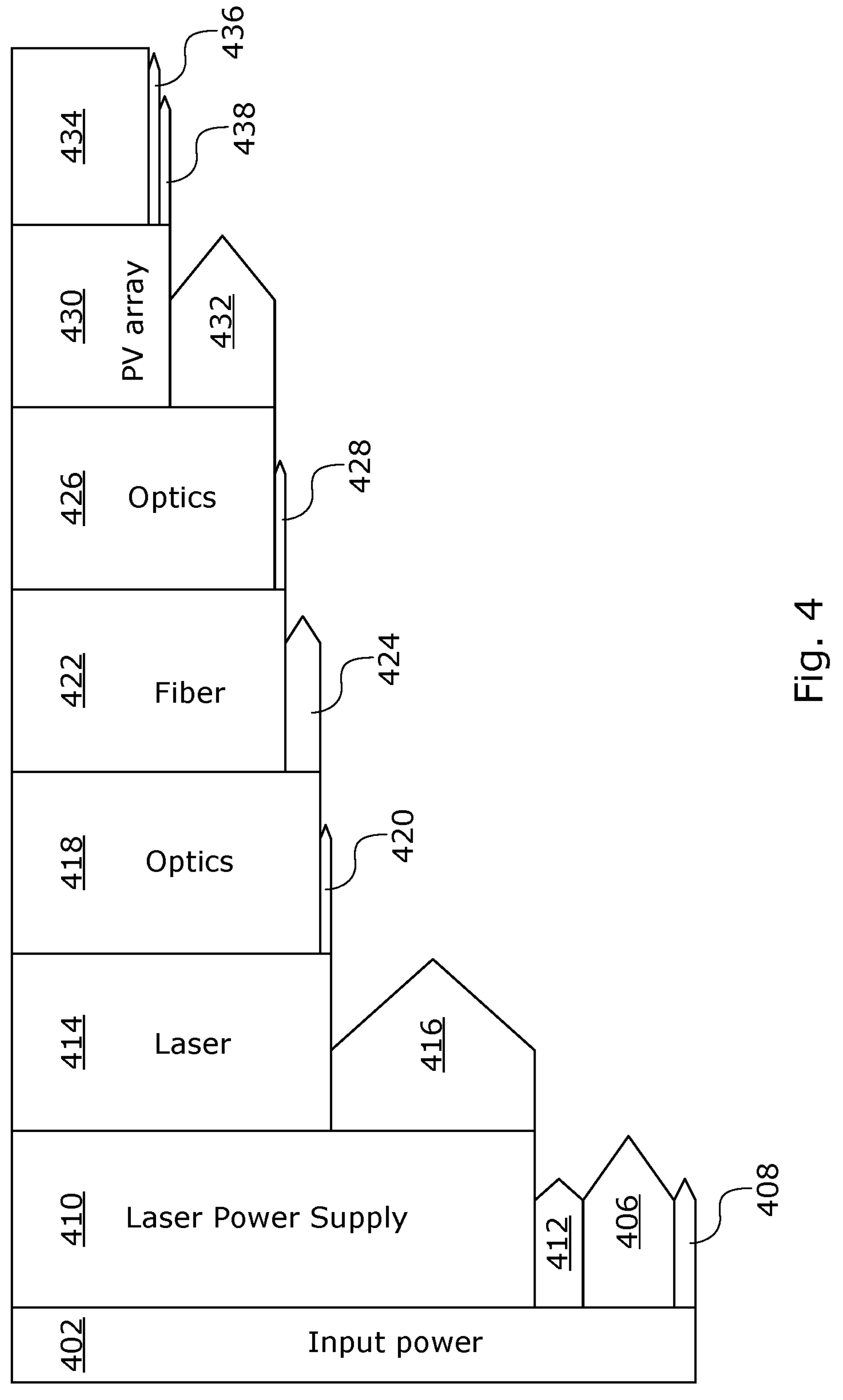
FIG. 4 shows contributors to end-to-end efficiency losses for a power beaming system.

End-to-end efficiency of a power beaming system can be calculated simply as electric power out divided by electric power in, but care should be used in examining contributions to this efficiency. FIG. 4 shows contributors to losses in various locations of a PoF system, but those of ordinary skill in the art will appreciate that an FSP system would have a very similar diagram, replacing fiber losses with atmospheric losses. The figure is not intended to be to scale for any particular system, but in general the height of each box represents an amount of power. Block 402 represents AC input power to transmitter 102. Some of this power is consumed by running the chiller (represented by arrow 406), and additionally there are generally some overhead losses upstream of the laser power supply (represented by arrow 408). Laser efficiencies quoted by laser vendors often neglect power consumed by a laser chiller (represented by arrow 406) and heat removed by a chiller (represented by arrow 416), which may be significant. Chiller quality is reported as a coefficient of performance, which represents an amount of cooling power divided by power draw. For example, a chiller capable of removing 100 W of heat from a laser with a chiller power draw of 50 W would be reported as having a coefficient of performance of 2. If this chiller is used to run a laser that draws 300 W of power from its power supply (box 410) to produce a 200 W power beam (box 414), removing 100 W of heat (arrow 416), a laser vendor might report the "laser efficiency" as 67% (box 414 divided by box 410), but the overall efficiency of the laser+chiller would be $$\frac{200\ W}{50\ W+300\ W}=57\%$$

(box 414 divided by the sum of box 410 and arrow 406). In addition, losses due to a power supply (arrow 412) and overhead losses (arrow 408) may or may not be included in quoted laser efficiency. Thus, reported "transmitter efficiency" might be represented by the ratio of the heights of boxes 414 over 410, 414 over (410 plus 406), 414 over 402, or some other combination of values. The most reliable way to determine overall efficiency of a transmitter is to measure the power of an emitted beam and divide it by power draw from all sources, but this data can be difficult to measure practically in some cases.

After the power beam leaves the transmitter, it will have losses in transit to the receiver. The power after the beam passes through transmitter optics is shown at box 418, with losses at the transmitter optics shown as arrow 420. Power carried through the optical fiber is shown as box 422, with losses in the fiber shown as box 424. Of course, unlike this simple diagram, fiber losses accumulate over distance. Optical fibers may have loss levels quoted in dB/km. If the 200

W power beam mentioned above travels through 1 km of fiber having a loss level of 2 dB/km, only 200 W$\times10^{-0.2}$=126 W would be expected to arrive at the receiver (box 422). The power after passing through receiver optics is shown as box 426, with optics losses shown as arrow 428. The PV array may have very significant losses, with electrical power generated by the array shown as box 430 and the losses shown by arrow 432. These losses are shown in more detail below in connection with FIG. 5. DC power conversion after the PV array may also have losses (arrow 436), and there may be other receiver overhead losses (arrow 438), such as a controller, safety system emitters, and communications, with box 434 showing the final output power of the power beaming system. "True" end-to-end efficiency would be represented by the height of box 434 divided by the height of box 402, but many different ratios may be quoted as "efficiency" of a power beaming system. In particular, losses represented by arrows 406, 408, 412, 420, 428, 436, and 438 are often overlooked in building power beaming systems.

Figure 5:
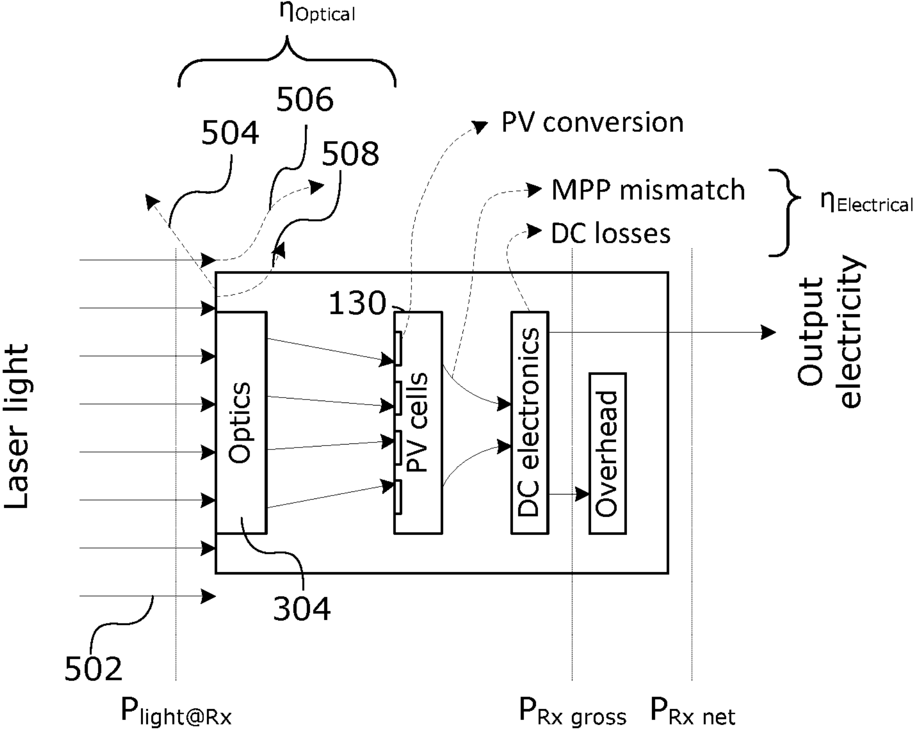
FIG. 5 shows potential efficiency losses for a power receiver.

Some experimenters assume that the efficiency of a multi-cell power receiver is the same as the efficiency of one of the component cells, but we have found this to be an oversimplification. FIG. 5 shows some sources of efficiency losses for a receiver, capturing more detail than is shown in the Sankey diagram of FIG. 4. Laser light 502 reaches optics 304, but some amount of light is reflected (at 504), misses the receiver (at 506), or is absorbed (at 508). At the PV cells, more light can be lost by reflection or by missing PV array 130, as further described in U.S. patent application Ser. No. 17/613,015 (light missing or reflected from array 130 is not shown for clarity in FIG. 5). Losses due to reflection, to absorption, or to light simply failing to be captured by optical components (both optics 304 and PV cells 130) are all combined in the calculations below into a parameter denoted as $\eta_{optical}$.

Further losses may be caused by the PV conversion (the PV cell efficiency typically quoted by PV cell vendors, modified by the temperature of the PV cells), by maximum power point mismatch, by ohmic losses in any wires or connections, and/or by DC conversion losses (if the receiver includes a DC converter). These losses are grouped together in a parameter $\eta_{electrical}$. The receiver may further consume "overhead" power, for example to run electronics, cooling fans, telemetry, or other components. A "receiver gross efficiency ratio" is defined as the gross receiver efficiency (upstream of overhead losses) divided by the efficiency of the component PV cells (each at their cell operating intensity):

$$\mathcal{H}_{gross} = \frac{\eta_{RX\ gross}}{\eta_{PV}} = \eta_{optical}\eta_{electrical}.$$

When different component PV cells are operating at different cell efficiencies, we use the average efficiency of all PV cells in the array. This efficiency represents a more realistic estimate of the efficiency of a receiver design than simply taking the receiver efficiency to be the same as the PV cell efficiency, as further explained in International Patent Application No. PCT/US22/13570. Receivers described in that patent application and in U.S. Pat. Nos. 9,800,091 and 10,673,375 may have $\mathcal{H}_{gross}$ of 80% or more, where best estimates of other receivers (if the necessary data for calculation are published at all) tend to be below 40%. See, for example, P. Jenkins, et al., "Challenges in Receiver Design for Free-Space Optical Power Transfer," *Technical Digest of Optical Wireless and Fiber Power Transmission Conf.* 2019, OWPT-5-04 (2019), which reported a non-PV $\eta_{electrical}$ of up to ~67% for a 4-cell array. Assuming a 50% optical efficiency based on beam size relative to PV array size and estimating some parameters from included graphs, we calculated a gross efficiency ratio $\mathcal{H}_{gross}$ of about 30% for Jenkins' system.

Example 1

Efficiency of an end-to-end PoF system was examined. The laser is a diode laser having a maximum output of 200 W and operating at 808 nm. The laser used was manufactured around 2013; more recent lasers typically have higher efficiencies. DC power consumed by the laser was measured at 393 W when the power supply was set to 44 A (nominal). The power draw of the chiller used in these tests could not be easily tested with available equipment, but we estimated it to be about 230-420 W, mostly to drive the pump (more efficient chillers than the one used in this example are also available). Estimates of power draw were made using a different but very similar chiller with a poorly tuned control loop, which switched from cooling the water (using 230 W-280 W) to heating the water (using around 420 W) when the water became too cold. If the water does not become cold enough to cause the chiller to switch into heating mode, 250 W seems a reasonable estimate for power draw of this type of chiller.

A 100 m step-index optical fiber with a core size of 400 μm and an NA of 0.22 was tested in situ on a 28 cm diameter spool. Optical power was only measured at the output end of the spool. With the power supply set to 44 A, optical power at the output end of the 100 m fiber was 147 W. Most of this light output was efficiently transferred to the PV cells, with reflection from non-PV surfaces, scattering, and absorption losses just under 2%. The 4 PV cells used were multilayer GaAs-based photovoltaics. Their efficiency was not measured, but prior measurements of the same PV cell design by the same vendor put their efficiency at greater than 60%.

Figure 6A:
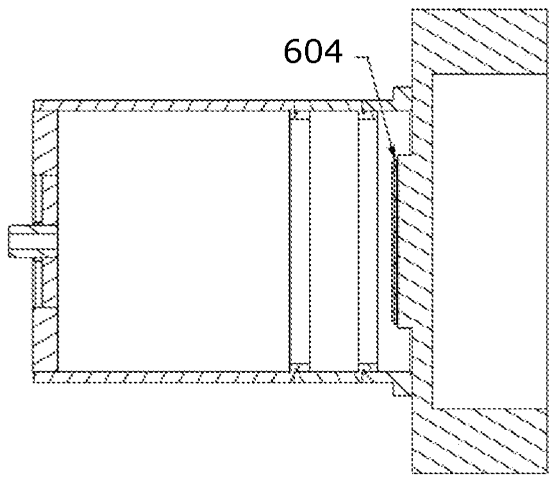
FIG. 6A and FIG. 6B, which may be referred to herein collectively as FIG. 6, are cross-sectional and plan diagrams of the power receiver described in Examples 1-3.
Figure 6B:
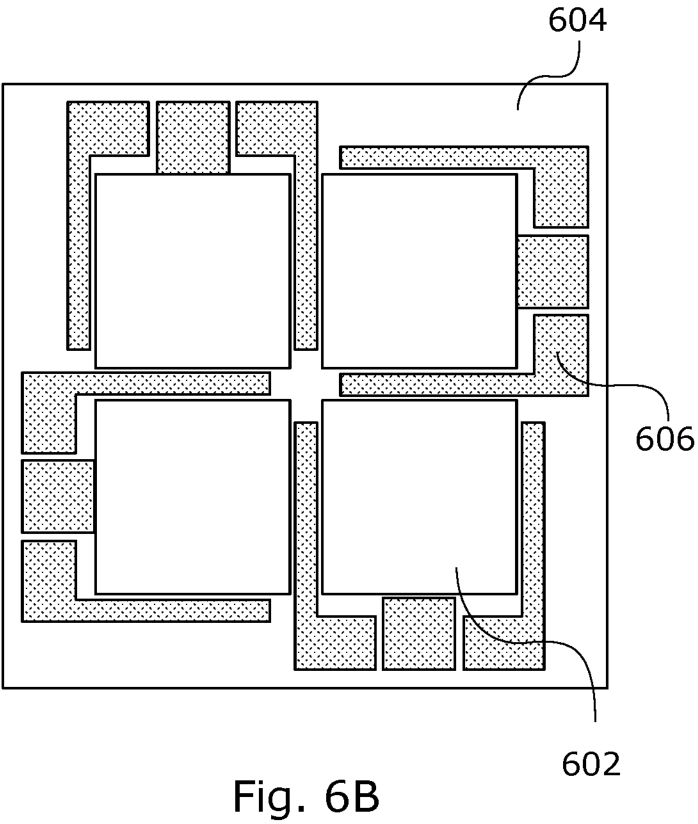

FIG. 6 shows diagrams of the receiver architecture used in Examples 1-3, in cross-sectional view (FIG. 6A) and plan view (FIG. 6B). Each of these three receivers used an array of four PV cells 602 mounted on printed circuit board 604. Printed circuit board 604 was printed with copper connections 606 for PV cells 602 as illustrated.

The PV output power was about 76 W. Taking an estimate of total power draw of the laser and the chiller under these conditions as 643 W, the end-to-end efficiency of the system was estimated to be about 12% when the laser power supply was set to 44 A. However, given the uncertainty in determining the power draw of the chiller, end-to-end efficiency could have been anywhere from 9-12%. Efficiency of the laser tends to increase as it approaches full rated optical power output, while efficiency of the PV cells decreases as their temperature increases, an effect that increases as transmitted power levels increase.

The receiver's measured optical-to-electrical efficiency was 51.6%. Dividing out 60% PV cell efficiency means that the receiver design efficiency is 86%. Fiber loss was estimated to be ~6%, plus the fiber tip surface Fresnel losses of ~3.4% per surface, for a total of transmissivity of 87.7%. The combined laser plus fiber efficiency was measured to be ~37%, which means the system design efficiency was probably about 54% (although it might have been as low as 40.5% for the low end of the above-estimated end-to-end efficiency).

It is also noted that this system (and those of Examples 2, 3, and 6) lacked a significant number of features that may impair nominal efficiency but will be necessary for a commercial power-over-fiber system: for example, it had no built-in telemetry and no active safety system.

Example 2

In this example, a PoF system was used to power an unmanned underwater vehicle (UUV) via a fiber optic cable. A base station included a more efficient 200 W laser than the one used in Example 1 (purchased in 2017), optics, laser control electronics, a chiller, and a controller with viewing screen. The 200 μm-core fiber optic cable was 20 m long and bundled power and data cables together into a 3.8 mm diameter package. The PoF system demonstrated that it could supply more than 70 W of power to the UUV, which was able to maneuver in a water-filled tank for over an hour using only laser power. We note that the laser in this example was run below its full power capability, but we did not collect exact power consumption data. While we thus did not obtain an exact end-to-end efficiency measurement for this example system, it was estimated to be about 12-13%.

This system used similar PV cells and receiver design as in the previous example, so the receiver design efficiency is expected to be roughly the same (i.e., 86%). Because of the more efficient laser (which reduces chiller load) and minor transmitter design changes, the system design efficiency is estimated to be higher than in the previous example by a few percent (i.e., probably in the range of ~45%-59%).

Example 3

In this example, a PoF system including components similar to those described above in Example 1 (except that the length of the optical fiber was only about 5 m) was used to power a hovering quadcopter for about 13 minutes (a time which was terminated only for convenience and not due to any technical limitations). The lighter weight of optical fiber makes it preferable to copper wire for transmitting power to a tethered aerial vehicle. The quadcopter was tethered in a frame for flight so that full lift thrust could be demonstrated without adding in the complexities of vehicle control with an un-optimized fiber that would have been required for free flight. The fully assembled unit, not counting the optical fibers, weighed 924 g, of which about 420 g was the weight of the receiver. While a power output of about 70 W was measured during flight, this power output measurement was known to be artificially low due to electrical noise. When the power receiver was subsequently hooked to an electronic load to measure actual output power at the same laser settings, output power was measured to be 94 W. This power represents an efficiency of about 52% from optical power into the receiver to usable electric output, or a best guess of 12% end-to-end efficiency (given limitations in measuring input power). Except for an improved heat sink and structural mass reductions, the receiver design was similar to those in examples 2 and 3, therefore the receiver design efficiency should also be similar (i.e., 86%). The system design efficiency should also be similar to that of example 1, i.e., 40.5%-54%.

Example 4

Figure 7:
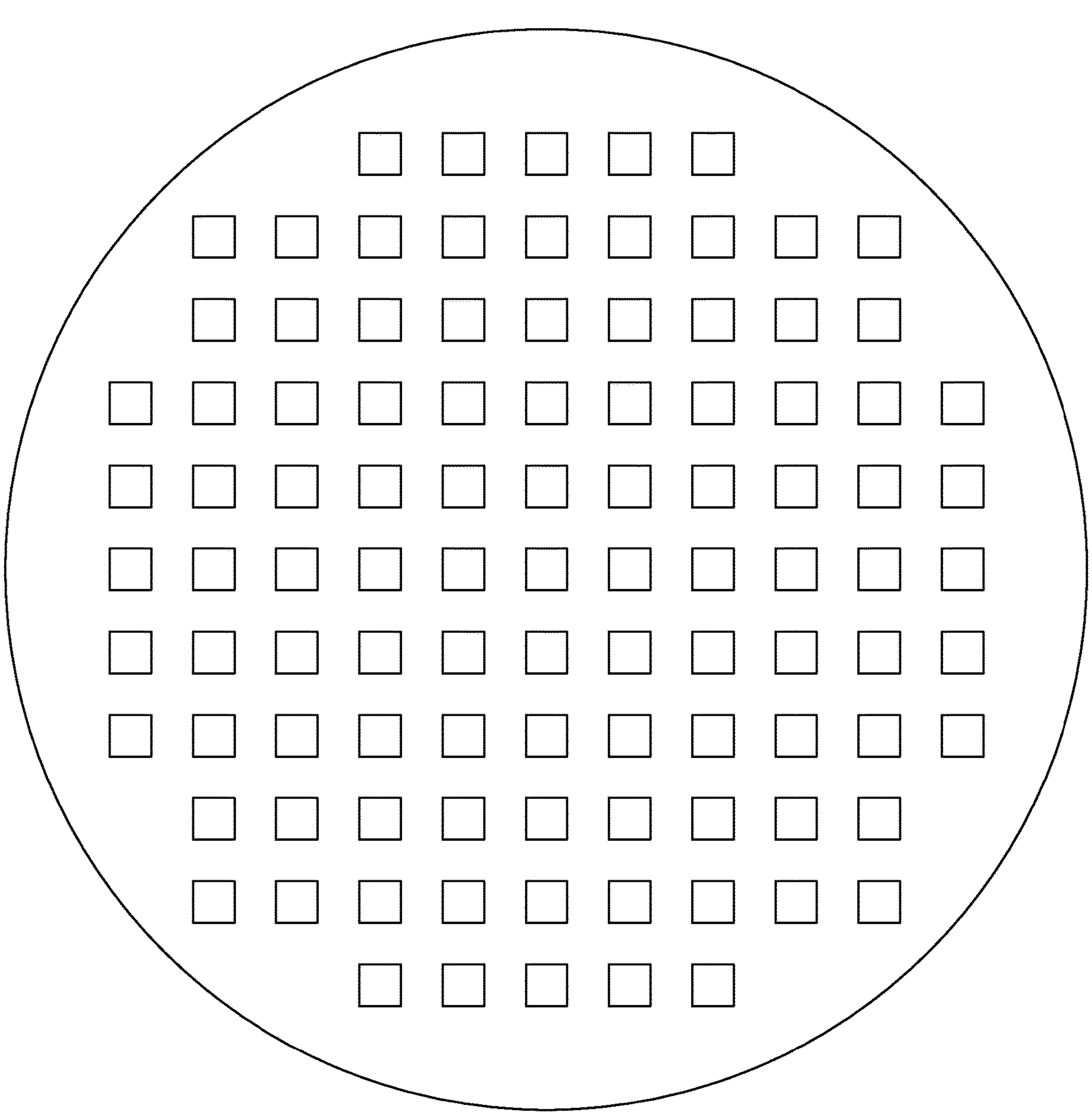
FIG. 7 shows a sketch of a PV cell layout for Example 4.

A 2 kW 976 nm laser beamed through the air about 324 m to a receiver, which collected the power beam with an array of 101 single-junction PV cells whose layout is shown in FIG. 7. The receiver stored energy in a battery for use by several devices, including LED lighting, two laptops, and a coffee maker. The system was run for about 14 hours (cumulative across two days). Peak input power to the transmitter was about 6,000 W (including a constant "base" power totaling about 3,300 W for the chiller, which was always running regardless of whether the laser was on or off, plus a HEPA fan for optics and an imbalance in the 3-phase power supply), and the peak laser output was a beam of about 1,700 W. The laser was about 50% efficient and the laser driver was about 80% efficient. Excluding the "base" power consumption, the differential efficiency of the rest of the transmitter (laser, laser power supply, optics, other electronics, and safety system) was ~29.6%.

The system included an active safety system that shut off the power beam whenever it detected impingement by an object. A wax "bird" on a stick was used to test the system by impinging on the beam; it shut off within 1 msec in each of several tests, then automatically restarted when the "bird" was removed.

The power beam at the receiver had a peak power of about 1,650 W (estimated based on atmospheric absorption), which was converted to a maximum 406 W of net usable power. The receiver had a high optical efficiency $\eta_{optical}$ of 98%. However, the measured electrical efficiency $\eta_{electrical}$ was only about 82%, yielding a receiver gross design efficiency ratio, $\mathcal{H}_{gross}$ of about 80%. The net receiver efficiency was about 25%, for an end-to-end efficiency of about 7%. The average PV cell efficiency was ~39%, therefore the net receiver design efficiency was ~64%, and system design efficiency was approximately 36%.

Example 5

Figure 8:
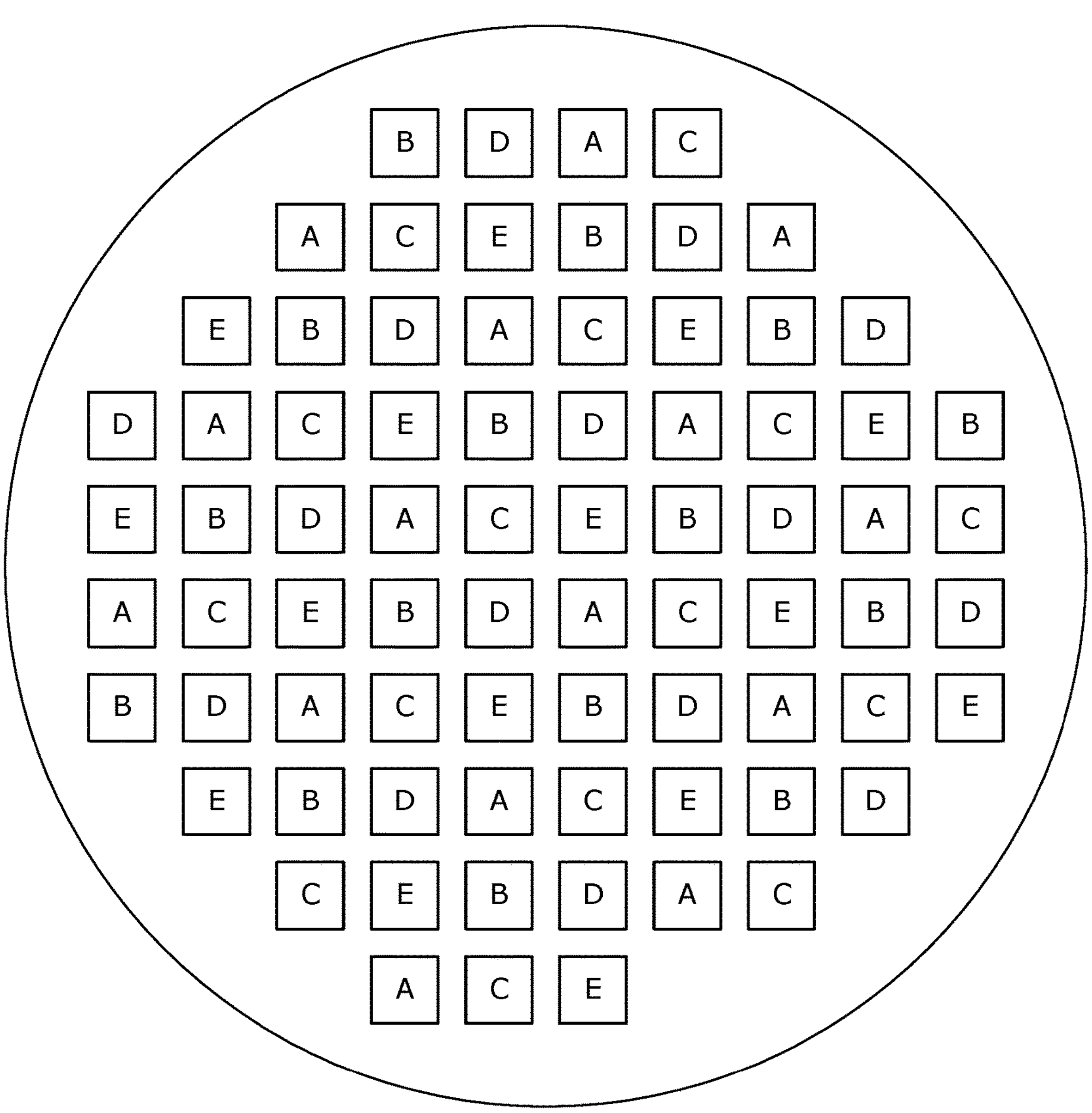
FIG. 8 shows a sketch of a PV cell layout for Example 5.

The same 2 kW 976 nm laser used in Example 4 was also used in this example to beam free-space power to a receiver. Power was beamed through the air about 160 m to the receiver, which collected the power beam with an array of 75 PV cells. Details of the wiring of this array, which had excellent electrical efficiency, may be found in co-pending and commonly owned International Application No. PCT/US22/13570, in particular in connection with FIG. 17 of that application, which is reproduced herein as FIG. 8. The electrical efficiency was determined by measuring the optical power just before it impinged the receiver, separately measuring the optical efficiency of just the receiver optics, and then measuring the array output power. The overall efficiency of the receiver was measured both with and without support electronics, which included an active safety system and a cooling fan. The support electronics had a static power consumption of about 21 W and did not increase with increasing power. The best efficiency was measured at the highest transmitted optical power of about 290 W. (Both the transmitter and the PV cells in the receiver were capable of operation at substantially higher power, but it was found that some of the receiver optics were overheated by the power beam, so the experiment did not attempt higher-power operation.) Without support electronics, this efficiency at this power level was measured to be about 38%. Including the support electronics, receiver efficiency was about 31%. The gross efficiency of the receiver was almost entirely accounted for by the PV cell and optical efficiencies, with only 2% losses being attributable to the electrical system. Overall, optical efficiency $\eta_{optical}$ was around 85%, electrical efficiency $\eta_{electrical}$ was about 98%, and the receiver gross design efficiency $\mathcal{H}_{gross}$ was about 83%.

The overall efficiency of the receiver was measured both with and without support electronics, which included an active safety system and a cooling fan. The support electronics had a static power consumption of about 21 W and did not increase with increasing power. The best efficiency was measured at the highest transmitted optical power of about 290 W. (Both the transmitter and the PV cells in the receiver were capable of operation at substantially higher power, but it was found that some of the receiver optics were overheated by the power beam, so the experiment did not attempt higher-power operation.) Without support electronics, this efficiency at this power level was measured to be about 38%. Including the support electronics, receiver efficiency was about 310%. The complete end-to-end efficiency of the system including all losses for the chiller and the support electronics was about 2.1% (part of the reason it was lower than in example 4 is that the laser was run at a lower output power in this example, therefore the constant base power was a larger fraction of input power). Neglecting the power consumed by the oversized chiller and by the support electronics, the efficiency of end-to-end power transmission was 11.3%. Even with the support electronics included in the calculation, the efficiency was over 9%. The system design efficiency was estimated at ~10%, showing that the choice of an always-on high power chiller reduced the system design efficiency compared to other laser systems (including those in examples 1-3).

Comparing Example 4 and Example 5, we see that an $\eta_{optical}$ and an $\eta_{electrical}$ of 98% were each (separately) achieved. It is expected that these efficiencies could be achieved together in a subsequent demonstration, which would yield a receiver gross design efficiency ratio of about 96%.

Example 6

A 976 nm laser having a vendor-quoted efficiency of 52% (driven by a power supply that is 93% efficient) is connected to a 500 m step-index silica optical fiber having a 1.7 dB/km loss at the laser wavelength. The system is designed to deliver 500 watts of usable electric output from the receiver. The chiller for the laser has a coefficient of performance of 3.5. In this example, the chiller is calculated to consume about 12.8% of the system input power. Using a receiver having an array of PV cells with a cell efficiency of 50%, and the non-laser portion of the transmitter being about 80% efficient (which includes the chiller and control electronics) and the receiver has a design efficiency ratio of about 72%, overall system efficiency (ratio of usable electric power out to electric power consumed) is calculated to be approximately 12%. The net receiver design efficiency ratio of 72% is a net number that includes cooling and other electronics, and is estimated based on previous PoF receivers. The receiver gross design efficiency ratio (i.e., just the direct optical and electrical losses) in this example is 76%, the difference between the efficiencies being an estimated 6% overhead power draw.

The end-to-end system efficiency is about 11.9% for the 500 m fiber. For a zero-length fiber with all other parameters the same, overall system efficiency is calculated to be about 14.5%. The system design efficiency (removing 52% laser efficiency, 50% PV efficiency, and 17.8% fiber losses) is therefore 55.7%.

In the following, further features, characteristics, and advantages are described by items:

Item 1: A power receiver that includes an optics unit, an array including a plurality of PV cells, a thermal management system configured to remove heat from the array, and a power management and distribution (PMAD) system configured to receive electricity from the array and to supply it to an external device. The optics unit is configured to receive a power beam and to shape the power beam, the shaped power beam having an operating intensity profile. The array is configured to convert the power beam into electricity. Each of the PV cells of the array has a cell efficiency defined as the ratio of an amount of electrical power produced by the PV cell divided by an amount of optical power incident on a location of that cell in the operating intensity profile of the shaped power beam. The array has a gross array efficiency defined as the ratio of an amount of electrical power produced by the array divided by an amount of optical power in the shaped power beam. The receiver has a gross design efficiency ratio defined as a ratio of the gross array efficiency to the average cell efficiency of the PV cells of the array. The receiver gross design efficiency ratio is greater than 70%. The power receiver has the advantage that the gross design efficiency ratio captures sources of inefficiency not routinely addressed in power receiver design.

Item 2: The power receiver of item 1, wherein the optics unit is configured to receive the power beam from an optical fiber.

Item 3: The power receiver of item 1 or 2, wherein the optics unit is configured to receive the power beam from free space.

Item 4: The power receiver of any of items 1-3, wherein the PMAD system is configured to supply at least 25 W of power to the external device.

Item 5: The power receiver of any of items 1-4, wherein the PMAD system is configured to supply at least 50 W of power to the external device.

Item 6: The power receiver of any of items 1-5, wherein the PMAD system is configured to supply at least 100 W of power to the external device.

Item 7: The power receiver of any of items 1-6, wherein the PMAD system is configured to supply at least 300 W of power to the external device.

Item 8: The power receiver of any of items 1-7, wherein the PMAD system is configured to supply at least 500 W of power to the external device.

Item 9: The power receiver of any of items 1-8, wherein the PMAD system is configured to supply electricity to a plurality of external devices.

Item 10: The power receiver of any of items 1-9, wherein the thermal management system is configured to remove at least 25 W of heat from the array.

Item 11: The power receiver of any of items 1-10, wherein the thermal management system is configured to remove at least 50 W of heat from the array.

Item 12: The power receiver of any of items 1-11, wherein the thermal management system is configured to remove at least 100 W of heat from the array.

Item 13: The power receiver of any of items 1-12, wherein the operating intensity profile has a peak intensity of at least 2 W/cm$^2$.

Item 14: The power receiver of any of items 1-13, wherein the operating intensity profile has a peak intensity of at least 5 W/cm$^2$.

Item 15: The power receiver of any of items 1-14, wherein the operating intensity profile has a peak intensity of at least 20 W/cm$^2$.

Item 16: The power receiver of any of items 1-15, wherein the operating intensity profile has a peak intensity of at least 75 W/cm$^2$.

Item 17: The power receiver of any of items 1-16, wherein the optics unit is configured to concentrate the received power beam.

Item 18: The power receiver of any of items 1-17, wherein the optics unit is configured to expand the received power beam.

Item 19: The power receiver of any of items 1-18, wherein the optics unit is configured to reduce a difference between a minimum and maximum intensity across a profile of the received power beam.

Item 20: The power receiver of any of items 1-19, wherein the array includes a multi-junction PV cell.

Item 21: The power receiver of any of items 1-20, wherein the gross design efficiency ratio is greater than 80%.

Item 22: The power receiver of any of items 1-21, wherein the gross design efficiency ratio is greater than 90%.

Item 23: The power receiver of any of items 1-22, wherein the gross design efficiency ratio is greater than 95%.

Item 24: The power receiver of any of items 1-23, further including a safety system configured to detect light escaping the optics unit, and, in response to detection of light escaping the optics unit, to signal a source of the power beam to reduce the power of the beam.

Item 25: The power receiver of any of items 1-24, wherein the array includes at least 4 PV cells.

Item 26: The power receiver of any of items 1-25, wherein the array includes at least 20 PV cells.

Item 27: The power receiver of any of items 1-26, wherein the array includes at least 75 PV cells.

Item 28: The power receiver of any of items 1-27, wherein the array includes at least 150 PV cells.

Item 29: A power transmission system that includes a power transmitter configured to create a power beam and to transmit the power beam into a transmission medium and a power receiver. The power transmitter includes a laser, a transmitter thermal management system, and a control system. The power receiver is configured to receive the power beam from the transmission medium, direct the power beam to a plurality of photovoltaic (PV) cells to convert the power beam into electrical power, and provide the converted electrical power to an external device. The power transmission system has an end-to-end efficiency defined as an amount of electrical power provided to the external device divided by an amount of power consumed by the power transmitter to create the power beam, a laser efficiency defined as an amount of optical power of the power beam as it exits the laser divided by an amount of electrical power consumed by the laser to create the power beam, a transmission medium efficiency defined as an amount of optical power as the power beam enters the power receiver divided by an amount of optical power as the power beam enters the transmission medium, a PV cell efficiency defined as an average efficiency of conversion of optical power into electrical power by the plurality of PV cells, and a gross system design efficiency defined as the end-to-end efficiency divided by a product of the gross laser efficiency, the transmission medium efficiency, and the gross PV cell efficiency. The gross system design efficiency is greater than 40%. The power transmission system has the advantage that the gross system design efficiency captures sources of inefficiency not routinely addressed in power transmission system design.

Item 30: The power transmission system of item 29, wherein the transmission medium includes an optical fiber.

Item 31: The power transmission system of item 30, wherein the optical fiber is at least 5 m long.

Item 32: The power transmission system of item 30 or 31, wherein the optical fiber is at least 20 m long.

Item 33: The power transmission system of any of items 30-32, wherein the optical fiber is at least 100 m long.

Item 34: The power transmission system of any of items 30-33, wherein the optical fiber is at least 1 km long.

Item 35: The power transmission system of any of items 29-34, wherein the transmission medium includes free space.

Item 36: The power transmission system of item 35, wherein the power receiver is separated from the power transmitter by at least 5 m.

Item 37: The power transmission system of item 35 or 36, wherein the power receiver is separated from the power transmitter by at least 20 m.

Item 38: The power transmission system of any of items 35-37, wherein the power receiver is separated from the power transmitter by at least 100 m.

Item 39: The power transmission system of any of items 35-38, wherein the power receiver is separated from the power transmitter by at least 1 km.

Item 40: The power transmission system of any of items 29-39, wherein the gross system design efficiency is greater than 50%.

Item 41: The power transmission system of any of items 29-40, wherein the gross system design efficiency is greater than 60%.

Item 42: The power transmission system of any of items 29-41, wherein the gross system design efficiency is greater than 70%.

Item 43: The power transmission system of any of items 29-42, wherein the gross system design efficiency is greater than 80%.

Item 44: The power transmission system of any of items 29-43, wherein providing the converted electrical power to an external device includes supplying at least 25 W of power to the external device.

Item 45: The power transmission system of any of items 29-44, wherein providing the converted electrical power to an external device includes supplying at least 50 W of power to the external device.

Item 46: The power transmission system of any of items 29-45, wherein providing the converted electrical power to an external device includes supplying at least 100 W of power to the external device.

Item 47: The power transmission system of any of items 29-46, wherein providing the converted electrical power to an external device includes supplying at least 300 W of power to the external device.

Item 48: The power transmission system of any of items 29-47, wherein providing the converted electrical power to an external device includes supplying at least 500 W of power to the external device.

Item 49: The power transmission system of any of items 29-48, wherein the plurality of PV cells includes a multi-junction PV cell.

Item 50: A method of receiving power that includes receiving a power beam at an optics unit, shaping the power beam with the optics unit, the shaped power beam having an operating intensity profile, receiving the shaped power beam from the optics unit at an array including a plurality of photovoltaic (PV) cells, converting the received power beam into electricity with the array of PV cells, wherein converting the received power beam into converted electricity includes removing heat from the array of PV cells with a receiver thermal management system, receiving the converted electricity with a power management and distribution (PMAD) system, and supplying the received converted electricity to an external device. Each of the PV cells of the array has a cell efficiency defined as the ratio of an amount of electrical power produced by the PV cell divided by an amount of optical power incident on the cell at the operating intensity of the shaped power beam. The array has a gross array efficiency defined as the ratio of an amount of electrical power produced by the array divided by an amount of optical power in the shaped power beam. The receiver has a gross design efficiency ratio defined as a ratio of the gross array efficiency to the average cell efficiency of the PV cells of the array. The receiver efficiency ratio is greater than 70%. The method has the advantage that the gross design efficiency ratio captures sources of inefficiency not routinely addressed in power receiver design.

Item 51: A method of transmitting power that includes generating a power beam with a power transmitter, transmitting the generated power beam into a transmission medium, receiving the power beam from the transmission medium at a power receiver remote from the power transmitter, directing the received power beam to a plurality of photovoltaic (PV) cells to convert the power beam into electrical power, and providing the converted electrical power to an external device. The power transmitter includes a laser, a transmitter thermal management system, and a control system. The power transmission method has an end-to-end efficiency defined as an amount of electrical power provided to the external device divided by an amount of power consumed by the power transmitter to create the power beam, a laser efficiency defined as an amount of optical power of the power beam as it exits the laser divided by an amount of electrical power consumed by the laser to create the power beam, a transmission medium efficiency defined as an amount of optical power as the power beam enters the power receiver divided by an amount of optical power as the power beam enters the transmission medium, a PV cell efficiency defined as an average efficiency of conversion of optical power into electrical power by the plurality of PV cells, and a gross system design efficiency defined as the end-to-end efficiency divided by a product of the laser efficiency, the transmission medium efficiency, and the PV cell efficiency. The gross system design efficiency is greater than 40%. The method has the advantage that the gross system design efficiency captures sources of inefficiency not routinely addressed in power transmission system design.

While the foregoing has described what are considered to the best mode and/or other examples, it is understood that various modifications may be made therein, and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended to be as broad as is consistent with the ordinary meanings of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracement of such subject matter is hereby disclaimed.

Except as stated in the previous paragraph, nothing that has been stated or illustrated is intended or should be interpreted to cause a dedication of any component, step, feature, objects, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity from another without necessarily implying any relationship or order between such entities. The terms "comprise" and "include" in all their grammatical forms are intended to cover a non-exclusive inclusion, so that a process, method, article, apparatus, or composition of matter that comprises or includes a list of elements may also include other elements not expressly listed. An element preceded by "a" or "an" does not, without further constraints, preclude the existence of additional identical or similar elements.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features may be grouped together in various examples for the purpose of clarity of explanation. This method of disclosure is not to be interpreted as reflecting an intention that the claims require more features than are expressly recited in each claim. Furthermore, features from one example may be freely included in another, or substituted for one another, without departing from the overall scope and spirit of the instant application.

What is claimed is:

1. A power receiver, comprising:

an optics unit configured to receive a power beam and to shape the power beam, the shaped power beam having an operating intensity profile;

an array including a plurality of photovoltaic (PV) cells configured to receive the shaped power beam from the optics unit and to convert it into electricity;

a thermal management system configured to remove heat from the array; and a power management and distribution (PMAD) system configured to receive electricity from the array and to supply it to an external device, wherein:

each of the PV cells of the array has a cell efficiency defined as the ratio of an amount of electrical power produced by the PV cell divided by an amount of optical power incident on a location of that cell in the operating intensity profile of the shaped power beam;

the array has a gross array efficiency defined as the ratio of an amount of electrical power produced by the array divided by an amount of optical power in the shaped power beam; and the receiver has a gross design efficiency ratio defined as a ratio of the gross array efficiency to an average of the respective cell efficiencies of the PV cells of the array, the receiver gross design efficiency ratio being greater than 70%.

2. The power receiver of claim 1, wherein the optics unit is configured to receive the power beam from an optical fiber.

3. The power receiver of claim 1, wherein the optics unit is configured to receive the power beam from free space.

4. The power receiver of claim 1, wherein the PMAD system is configured to supply at least 25 W of power to the external device.

5. The power receiver of claim 1, wherein the PMAD system is configured to supply at least 500 W of power to the external device.

6. The power receiver of claim 1, wherein the PMAD system is configured to supply electricity to a plurality of external devices.

7. The power receiver of claim 1, wherein the thermal management system is configured to remove at least 25 W of heat from the array.

8. The power receiver of claim 1, wherein the operating intensity profile has a peak intensity of at least 2 $W/cm^2$.

9. The power receiver of claim 1, wherein the optics unit is configured to concentrate the received power beam.

10. The power receiver of claim 1, wherein the optics unit is configured to expand the received power beam.

11. The power receiver of claim 1, wherein the optics unit is configured to reduce a difference between a minimum and maximum intensity across a profile of the received power beam.

12. The power receiver of claim 1, wherein the array includes a multi-junction PV cell.

13. The power receiver of claim 1, wherein the gross design efficiency ratio is greater than 80%.

14. The power receiver of claim 1, further comprising a safety system configured to:
- detect light escaping the optics unit; and
- in response to detection of light escaping the optics unit, to signal a source of the power beam to reduce the power of the beam.

15. The power receiver of claim 1, wherein the array includes at least 4 PV cells.

16. A power transmission system, comprising:
- a power transmitter including a laser, a transmitter thermal management system, and a control system, the power transmitter configured to create a power beam and to transmit the power beam into a transmission medium; and
- a power receiver configured to:
  - receive the power beam from the transmission medium;
  - direct the power beam to a plurality of photovoltaic (PV) cells to convert the power beam into electrical power; and
  - provide the converted electrical power to an external device, wherein:
- the power transmission system has:
  - an end-to-end efficiency defined as an amount of electrical power provided to the external device divided by an amount of power consumed by the power transmitter to create the power beam;
  - a laser efficiency defined as an amount of optical power of the power beam as it exits the laser divided by an amount of electrical power consumed by the laser to create the power beam;
  - a transmission medium efficiency defined as an amount of optical power as the power beam enters the power receiver divided by an amount of optical power as the power beam enters the transmission medium;
  - a PV cell efficiency defined as an average efficiency of conversion of optical power into electrical power by the plurality of PV cells;
  - a gross system design efficiency defined as the end-to-end efficiency divided by a product of the laser efficiency, the transmission medium efficiency, and the PV cell efficiency; and
- the gross system design efficiency is greater than 40%.

17. The power transmission system of claim 16, wherein the transmission medium includes an optical fiber.

18. The power transmission system of claim 16, wherein the transmission medium includes free space.

19. A method of receiving power, comprising:
- receiving a power beam at an optics unit;
- shaping the power beam with the optics unit, the shaped power beam having an operating intensity profile;
- receiving the shaped power beam from the optics unit at an array including a plurality of photovoltaic (PV) cells;
- converting the received power beam into electricity with the array of PV cells, wherein converting the received power beam into converted electricity includes removing heat from the array of PV cells with a receiver thermal management system;
- receiving the converted electricity with a power management and distribution (PMAD) system; and
- supplying the received converted electricity to an external device, wherein:
  - each of the PV cells of the array has a cell efficiency defined as the ratio of an amount of electrical power produced by the PV cell divided by an amount of optical power incident on the cell at the operating intensity of the shaped power beam;
  - the array has a gross array efficiency defined as the ratio of an amount of electrical power produced by the array divided by an amount of optical power in the shaped power beam; and
  - the receiver has a gross design efficiency ratio defined as a ratio of the gross array efficiency to an average of the respective cell efficiencies of the PV cells of the array, the receiver gross design efficiency ratio being greater than 70%.

20. A method of transmitting power, comprising:
- generating a power beam with a power transmitter including a laser, a transmitter thermal management system, and a control system;
- transmitting the generated power beam into a transmission medium;
- receiving the power beam from the transmission medium at a power receiver remote from the power transmitter;
- directing the received power beam to a plurality of photovoltaic (PV) cells to convert the power beam into electrical power; and
- providing the converted electrical power to an external device, wherein the power transmission method has:
  - an end-to-end efficiency defined as an amount of electrical power provided to the external device divided by an amount of power consumed by the power transmitter to create the power beam;
  - a laser efficiency defined as an amount of optical power of the power beam as it exits the laser divided by an amount of electrical power consumed by the laser to create the power beam;
  - a transmission medium efficiency defined as an amount of optical power as the power beam enters the power receiver divided by an amount of optical power as the power beam enters the transmission medium;

a PV cell efficiency defined as an average efficiency of conversion of optical power into electrical power by the plurality of PV cells;

a gross system design efficiency defined as the end-to-end efficiency divided by a product of the laser efficiency, the transmission medium efficiency, and the PV cell efficiency; and the gross system design efficiency is greater than 40%.

* * * * *